US009972065B2

(12) United States Patent
Gopalakrishnan et al.

(10) Patent No.: US 9,972,065 B2
(45) Date of Patent: May 15, 2018

(54) RESOURCE LAYOUT RANDOMIZATION FOR GPU EXECUTION

(71) Applicant: Apple Inc., Cupertino, CA (US)

(72) Inventors: Harshavardhan P. Gopalakrishnan, San Jose, CA (US); Dean P. Macri, Sherwood, OR (US); Dwarakanath Rajagopal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/275,257

(22) Filed: Sep. 23, 2016

(65) Prior Publication Data
US 2018/0089794 A1 Mar. 29, 2018

(51) Int. Cl.
| G06F 12/14 | (2006.01) |
| G06T 1/20 | (2006.01) |
| G06F 21/62 | (2013.01) |
| G06T 1/60 | (2006.01) |
| G06F 9/455 | (2018.01) |

(52) U.S. Cl.
CPC ............ *G06T 1/60* (2013.01); *G06F 12/14* (2013.01); *G06F 21/62* (2013.01); *G06T 1/20* (2013.01); *G06F 2009/45583* (2013.01); *G06T 2200/28* (2013.01)

(58) Field of Classification Search
None
See application file for complete search history.

(56) References Cited

U.S. PATENT DOCUMENTS

| 7,237,036 | B2* | 6/2007 | Boucher | G06F 13/385 370/396 |
| 7,546,430 | B1* | 6/2009 | Miller | G06F 12/1408 711/163 |
| 9,069,586 | B2* | 6/2015 | Dang | G06F 9/455 |
| 2006/0267990 | A1* | 11/2006 | Rogers | G06T 1/20 345/502 |
| 2010/0030967 | A1* | 2/2010 | Aciicmez | G06F 12/1408 711/125 |
| 2011/0010521 | A1* | 1/2011 | Wang | G06F 12/1027 711/207 |
| 2013/0160114 | A1* | 6/2013 | Greenwood | G06F 21/6218 726/21 |
| 2014/0245260 | A1* | 8/2014 | Joisha | G06F 8/456 717/120 |
| 2016/0247248 | A1* | 8/2016 | Ha | G06F 9/455 |

\* cited by examiner

*Primary Examiner* — Joni Richer
(74) *Attorney, Agent, or Firm* — Blank Rome LLP

(57) ABSTRACT

The embodiments disclosed herein relate to the field of graphics processing and, without limitation, the use of hardware and software in the memory layout of graphics items to prevent the malicious use of graphics resources. In greater particularity, embodiments of the disclosure provide varying software and hardware arrangements for transforming an allocated resource address that is deterministic and often visible to software in the system into an effective address that is neither deterministic nor visible to most software. For example, in an embodiment of the disclosure, software in the user-space of the operating system may use allocated addresses to map certain graphics resources for GPU access. When those allocated addresses are presented to the kernel, the addresses are transformed to effective addresses, which may be both randomized (e.g., not easily predictable from the allocated address) and/or obscured from the user space processes.

20 Claims, 11 Drawing Sheets

| 370 APPLICATION A | 371 PHOTOS | 372 QUICKEN | 373 IMOVIE | 374 APPLICATION B |
|---|---|---|---|---|
| 360 OTHER APPLICATION SERVICES | 361 SPRITE KIT | 362 SCENE KIT | 363 CORE ANIMATION | 364 CORE GRAPHICS |
| 350 O/S SERVICES | 351 OPENGL | 352 METAL | 353 SOFTWARE RAYTRACER | 354 SOFTWARE RASTERIZER |

O/S KERNEL 345

HARDWARE 340

RESOURCE LAYOUT RANDOMIZATION FOR GPU EXECUTION

BACKGROUND

Graphics processing units (GPUs) have become important for processing data-parallel graphics tasks. Both graphics and non-graphics data-parallel tasks can be handled by GPUs, taking advantage of their massive parallel capabilities. In certain instances, the address of graphics resources or even rendered graphics may be deterministic, meaning that by running the same software (e.g., at a high level, a process, or at a low level, a command buffer) the system predictably locates the same items (e.g., resources or rendered graphics) at the same virtual addresses. This predictability allows processes in the system to potentially both retrieve data and/or tamper with it. The embodiments of this disclosure seek to illustrate hardware and software arrangements to mitigate and/or eliminate deterministic addressing in the area of graphics, and/or the effects of such addressing.

In the non-graphics areas of computing arts, some memory architecture arrangements use a technique called address space layout randomization. For example, current versions of Mac OSX™ use address space layout randomization within certain of the kernel drivers in order to randomize the location of data in the kernel memory. For example, when a kernel driver is loaded, an address space offset may be randomly selected, which results in a different memory layout for each invocation of the kernel driver. By way of explanation, the use of the word "kernel" in this disclosure may refer to a "kernel" as the core layer of an operating system, typically associated with the highest security level and hardware interaction (e.g., the use of hardware drivers). However, this disclosure also uses the word "kernel" for a different meaning that is associated with a type of GPU program. In particular, a "compute kernel" or "kernel" may refer to a program for a GPU (or DSP or FPGA). In the context of GPU operations, most programs for the GPU are classified as a kernel or a shader—kernels refer to compute operations and shaders refer to graphics operations. Here forward, the word kernel will be used without an accompanying elongated explanation, but context of the usage will inform the skilled artisan regarding whether the word is being use in the context a compute kernel (program for the GPU) or operating system kernel (core part of an operating system).

The use of address space memory randomization in an operating system such as Mac OSX™ does not provide any benefit to any deterministic addressing related to GPU operations. Thus, undesirable deterministic addressing in the graphics area may occur in the case of GPU processing (either graphics or compute). In such a case, for example, a driver may allocate and map a resource for access by GPU, where the mapping address is predictable for every iteration of the command buffer execution. Furthermore, in the sample situation where the CPU and GPU share virtual memory space and page tables, resource addresses may be determined by the allocating user level process. The behavior of this one example may be exploited by undesirable software that may modify the GPU command buffer to execute user modified kernels or shaders to read or write a resource at an 'arbitrary' but deterministic address using a modified kernel.

SUMMARY

The embodiments disclosed herein relate to the field of graphics processing and, without limitation, the use of hardware and software in the memory layout of graphics items to prevent the malicious use of graphics resources. In greater particularity, embodiments of the disclosure provide varying software and hardware arrangements for transforming an allocated resource address that is deterministic and often visible to software in the system into an effective address that is neither deterministic nor visible to most software. For example, in an embodiment of the disclosure, software in the user-space of the operating system may use allocated addresses to map certain graphics resources for GPU access. When those allocated addresses are presented to the kernel, the addresses are transformed to effective addresses, which may be both randomized (i.e. not easily predictable from the allocated address) and/or obscured from the user space processes. In another embodiment of the disclosure, software throughout the operating system layers may use allocated addresses to map certain graphics resources for GPU access. When those allocated addresses are presented to the GPU, the addresses are transformed to effective addresses, which are both randomized with respect to the allocated addresses and obscured from the software outside the GPU. Thus, in the foregoing examples, system malware cannot observe or predict the location of a resource and thereby tamper with or read the resource because the resource does not exist at the allocated address locations known to the malware (i.e., attempts to read or write to those locations will not have effects on the resources)

In one or more embodiments of the disclosure, the allocated address is transformed into an effective address by simply applying a random number or a derivative thereof to the allocated address. In another embodiment, a different function for transforming the allocated address into an effective address is used for each process requesting allocation of the resource. For example, if an instantiation of Apple™ iTunes™ requests allocation of a resource, then function 1 will be used to transform the allocated address into an effective address; but if another process or another instantiation of iTunes™ requests allocation of a resource, then function 2 will be used for the transformation.

In other embodiments, the nature of the transformation function that is used may depend upon other characteristic of the system, such as the GPU context or the command buffer submission identification. In yet other embodiments, the nature of each transformation may depend upon the type of resource being allocated. If a resource is a sensitive type, e.g. a render target, then a randomizing transformation may be used; but if a resource is not sensitive, e.g. a filter, then no transform may be applied. In yet another embodiment of the disclosure, the GPU page tables may be altered by the GPU to randomize resources' virtual addressing so none of the software in the system knows the actual virtual or real addresses of a sensitive resource.

BRIEF DESCRIPTION OF THE DRAWINGS

FIG. 3 shows an illustrative software layer and architecture diagram.

DETAILED DESCRIPTION

Figure 1:
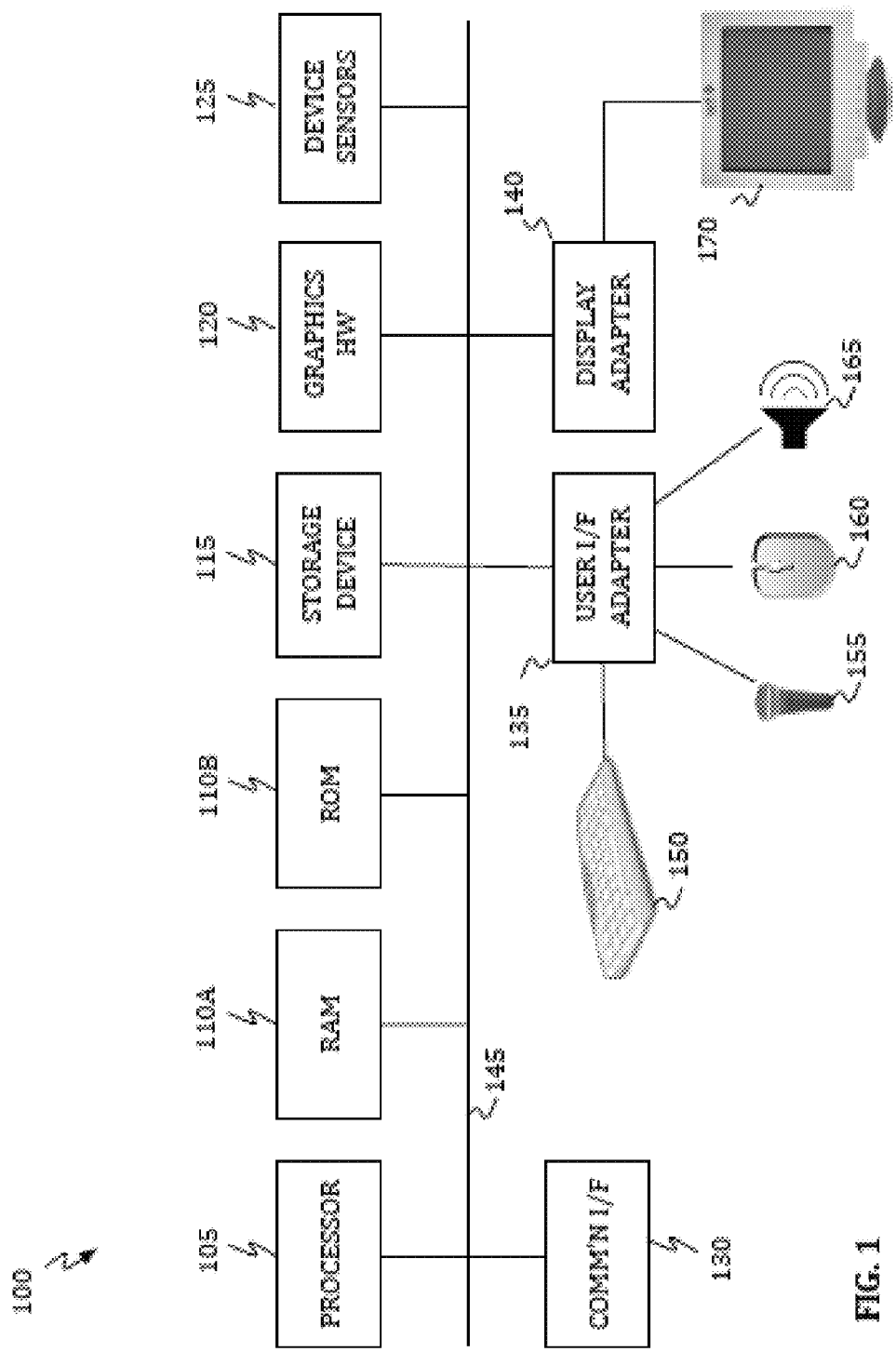
FIG. 1 shows a representative computer node that may be used, for example, as an end-user machine or a developer machine.

This disclosure pertains to systems, methods, and computer readable media to improve the operation of graphics systems. It also pertains to a variety of architectures for design and/or operation of a graphics system starting with an application program and extending to the presentation of visual content in the form of pixels or otherwise. In general, many embodiments of the invention envision transforming virtual addresses used to map resources for GPU access so as to randomize the resource locations within GPU virtual memory.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, leaving resorting to the claims as a potential necessity to determine such inventive subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "'one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of user interface and response systems and/or gesture identification processing systems.

Exemplary Hardware and Software

The inventive embodiments described herein may have implication and use in and with respect to all types of devices, including single- and multi-processor computing systems and vertical devices (e.g., cameras, gaming systems, appliances, etc.) that incorporate single- or multi-processing computing systems. The discussion herein is made with reference to a common computing configuration that may be discussed principally as an end user system. This common computing configuration may have a CPU resource including one or more microprocessors and a graphics processing resource including one or more GPUs. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software-operating environment is discussed below. The hardware configuration may be found, for example, in a server, a workstation, a laptop, a tablet, a desktop computer, a gaming platform (whether or not portable), a television, an entertainment system, a smart phone, a phone, or any other computing device, whether mobile or stationary, vertical or general purpose.

Referring to FIG. 1, the disclosed embodiments may be performed by representative computer system 100. For example the representative computer system may act as an end-user device or any other device that produces or displays graphics. System 100 may be embodied in any type of device, such as a general purpose computer system, a television, a set top box, a media player, a multi-media entertainment system, an image processing workstation, a hand-held device, or any device that may be coupled with or may incorporate display or presentation devices as discussed herein. Computer system 100 may include one or more processors 105, memory 110 (110A and 110B), one or more storage devices 115, and graphics hardware 120 (e.g., including one or more GPUs). Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus or backplane 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120, such computer program code may implement one or more of the methods or processes described herein. Communication interface 130 may include semiconductor-based circuits and be used to connect computer system 100 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170.

Processor 105 may execute instructions necessary to carry out or control the operation of many functions performed by system 100 (e.g., evaluation, transformation, and compilation of graphics programs). Processor 105 may, for instance, drive display 170 and receive user input from user interface adapter 135 or any other user interfaces embodied by a system. User interface adapter 135, for example, can take a variety of forms, such as a button, a keypad, a dial, a click wheel, a keyboard, a display screen, and/or a touch screen. Processor 105 may be any type of computing device, such as one or more microprocessors working alone or in combination with one or more GPUs, DSPs, system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs. System 100 (implementing one or more embodiments discussed herein) can provide the means for one or more users to control the same system (e.g., system 100) or another system (e.g., another computer or entertainment system) through user activity, which may include audio instructions, natural activity and/or predetermined gestures such as hand gestures.

Various embodiments of the invention may employ sensors, such as cameras. Cameras and like sensor systems may include auto-focus systems to accurately capture video or image data ultimately used to interpret user intent or commands. Since the motion of the user may be based upon subtle activity in small regions in the captured images (e.g., hands, fingers, face, mouth, brow etc.) the autofocus system may be used to separately focus on multiple regions of the image in order to access better information.

Returning to FIG. 1, sensors 125 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network. Memory 110 may include one or more different types of media used by processor 105, graphics hardware 120, and sensors 125 to perform device functions. Storage 115 may store data such as media (e.g., audio, image, and video files); metadata for media; computer program instructions; graphics programming instructions and graphics resources, and other software; including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, a GPU or processor 105, such computer program code may implement one or more of the acts or functions described herein (e.g., interpreting and responding to user activity including commands and/or gestures).

Figure 2:
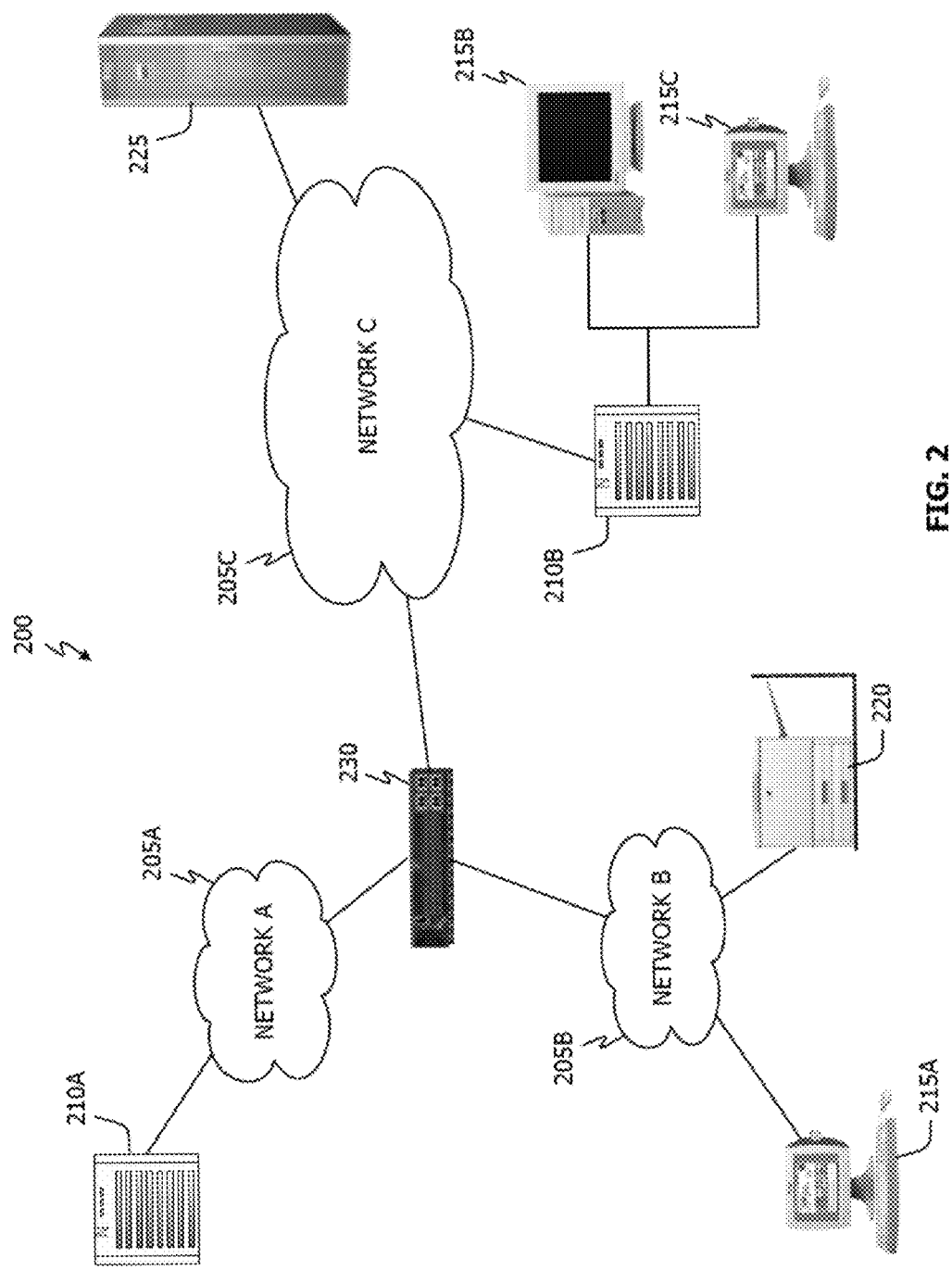
FIG. 2 shows an illustrative network environment associated with embodiments of the disclosure.

FIG. 2 depicts illustrative network architecture 200, within which the disclosed techniques may be implemented and the disclosed hardware may reside. This illustrative network 200 may include a plurality of networks 205, (i.e., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and also capable of communicating over networks 205. One embodiment using server computers may involve the operation of one or more central systems to process graphics information and distribute the processed information to nodes on a network for display.

Client computers 215 (i.e., 215A, 215B, and 215C), which may take the form of any smartphone, gaming system, tablet, computer, set top box, entertainment device/ system, television, telephone, communications device, or intelligent machine, including embedded systems, may also be coupled to networks 205, and/or data server computers 210. In some embodiments, network architecture 210 may also include network printers such as printer 220 and storage systems such as 225, which may be used to store multimedia items or other data that are referenced herein. To facilitate communication between different network devices (e.g., data servers 210, end-user computers 215, network printer 220, and storage system 225), at least one gateway or router 230 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including, but not limited to, PANs, LANs, WANs, and cellular networks).

As noted above, embodiments of the inventions disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 395 illustrating hardware 340, which may include, memory, CPUs, GPUs or other processing and/or computer hardware such as memory controllers and specialize hardware. Above the hardware layer is the O/S kernel layer 390 showing an example as O/S kernel 345, which is kernel software that may perform memory management, device management, and system calls (often the purview of hardware drivers, such as a GPU driver). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer exemplified by O/S services 350. O/S services may provide core O/S functions in a protected environment. In addition, O/S services shown in layer 385 may include frameworks for OpenGL 351, Metal 352, Software Raytracer 353, and a Pure Software Rasterizer 354. These particular examples all relate to graphics and/or graphics libraries and are chosen to illuminate the topic of many embodiments herein, which relate to graphics handling. These particular examples also represent graphics frameworks/libraries that may operate in the lower tier of frameworks, such that developers may use shading and graphics primitives and/or obtain fairly tightly coupled control over the graphics hardware. In addition, the particular examples named in FIG. 3 may also pass their work product on to hardware or hardware drivers, such as the GPU driver for display related material.

Referring again to FIG. 3, OpenGL 351 represents an example of a well-known library and application-programming interface for graphics rendering including 2D and 3D graphics. Metal 352 also represents a published graphics library and framework, but it is lower level than OpenGL 351, supporting fine-grained, low-level control of the organization, processing, and submission of graphics and computation commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphics hardware (e.g., using only the CPU). These libraries or frameworks shown within the O/S services layer 385 are only exemplary and intended to show the general level of the layer and how it relates to other software in a sample arrangement (e.g., kernel operations usually below and higher-level Applications Services 360 usually above). In addition, it may be useful to note that Metal 352 represents a published framework/library of Apple Inc. that is known to developers in the art. Furthermore, OpenGL 351 may represent a framework/library present in current versions of software distributed by Apple Inc.

Above the O/S services layer 385 there is an Application Services layer 380, which includes Sprite Kit 361, Scene Kit 362, Core Animation 363, and Core Graphics 364. The O/S services layer represents higher-level frameworks that are commonly directly accessed by application programs. In some embodiments of this disclosure the O/S services layer includes graphics-related frameworks that are high level in that they are agnostic to the underlying graphics libraries (such as those discussed with respect to layer 385). In such embodiments, these higher-level graphics frameworks are meant to provide developer access to graphics functionality in a more user/developer friendly way and allow developers to avoid work with shading and graphics primitives. By way of example, Sprite Kit 361 is a graphics rendering and animation infrastructure made available by Apple Inc. Sprite Kit 361 may be used to animate textured images or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphics rendering and animation infrastructure made available from Apple Inc. Core Animation 363 may be used to animate views and other visual elements of an application. Core Graphics 364 is a two-dimensional drawing engine from Apple Inc., which provides 2D rendering for applications.

Above the application services layer 380, there is the application layer 375, which may comprise any type of application program. By way of example, FIG. 3 shows three specific applications: photos 371 (a photo management, editing, and sharing program), Quicken 372 (a financial management program), and iMovie 373 (a movie making and sharing program). Application layer 375 also shows two generic applications 370 and 374, which represent the presence of any other applications that may interact with or be part of the inventive embodiments disclosed herein. Generally, embodiments of the invention employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the base hardware layer 395 and application 375 layers, shown by C100.

With reference again to FIG. 3, some embodiments may suggest the use of higher-level frameworks, such as those shown in application services layer 380. However, where intelligent analysis is performed on the particular graphics request, specific hardware and/or a specific library or low-level framework may be chosen to process the request. In these embodiments, the intelligent analysis may provide for on-the-fly decision making regarding the best path for the graphics request to follow down to hardware.

No limitation is intended by these hardware and software descriptions and the varying embodiments of the inventions herein may include any manner of computing device, such as Macs, PCs, PDAs, phones, servers, or even embedded systems, such as a dedicated device.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the inventive embodiments therefore should be determined with reference to the appended claims, along with the full scope of equivalents to which such claims are entitled. As used in this disclosure, (i) the words "include" and "including" and variations thereof, will not be deemed to be terms of limitation, but rather will be deemed to be followed by the words "without limitation," and (ii) unless the context otherwise requires, the word "or" is intended as an inclusive "or" and shall have the meaning equivalent to "and/or." Furthermore, in the appended claims, the terms "including" and "in which" are used as the plain-English equivalents of the respective terms "comprising" and "wherein."

GPU And CPU Memory Arrangements

Figure 4:
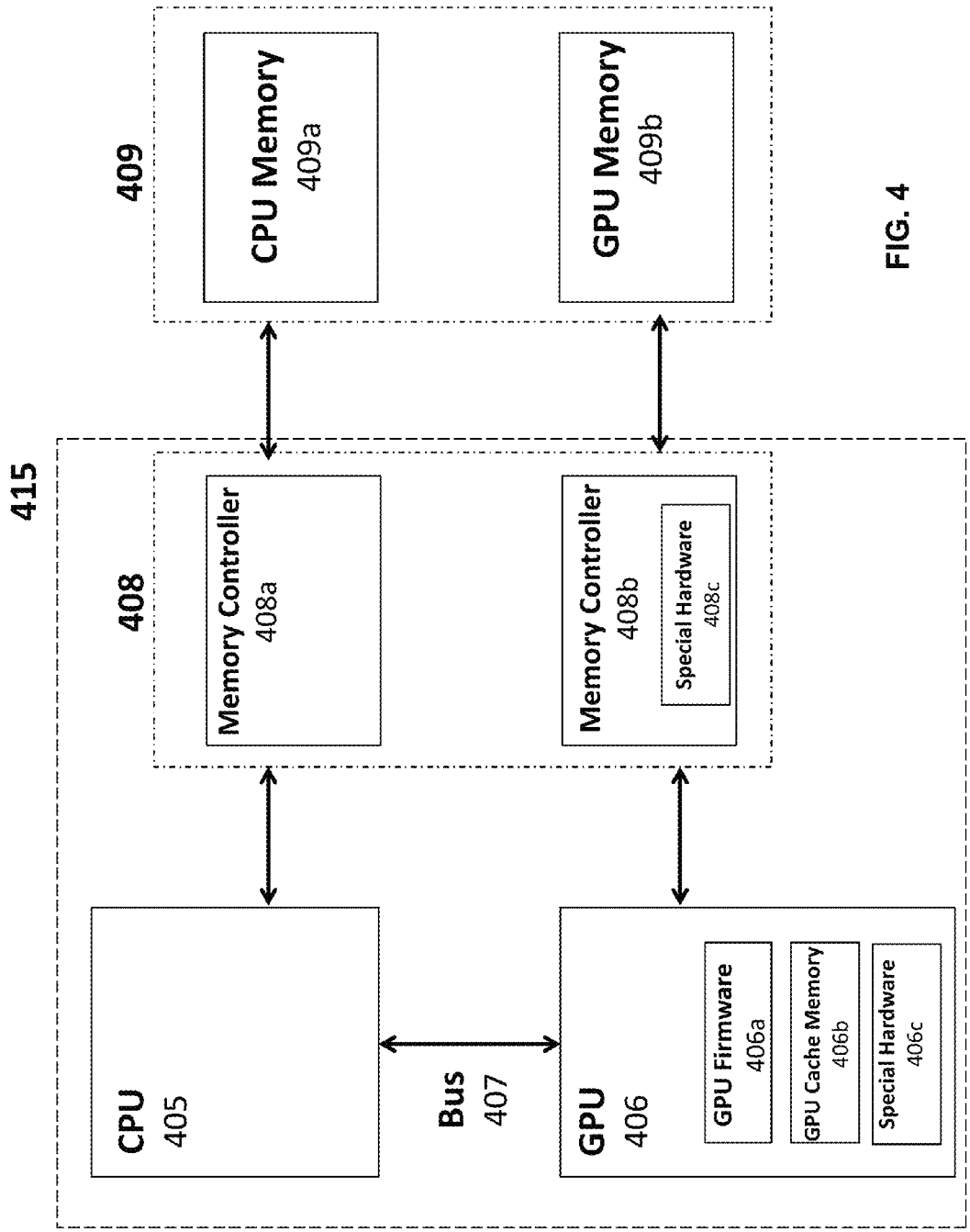
FIG. 4 shows an illustrative hardware configuration associated with some embodiments of the disclosure.

With reference to FIG. 4, there is shown an illustrative architecture for some embodiments featuring a CPU 405 and a GPU 406 joined by a bus 407. The CPU 405 and the GPU 406 are representative and each may represent one or more CPUs/GPUs. Bus 407 is also representative and may indicate any mechanism for communication between the CPU and GPU. In one embodiment, bus 407 may be a PCIe bus or a communications link of any known type.

Referring again to FIG. 4, GPU 406 is shown having GPU firmware 406a and GPU cache memory 406b. As known by skilled artisans, GPUs such as GPU 406 have many execution units. In the illustrated example, GPU 406 has firmware such as GPU firmware 406a to serve as internal software or BIOS that may be used to aid the functioning of the device. Certain embodiments of this disclosure may suggest added structure and functionality for the GPU firmware 406a, but the use and functioning of GPU firmware or BIOS is otherwise known to the skilled artisan. Similarly, GPU cache memory 406b is an illustrative cache representing one or more cache memories shown to facilitate discussion of some of the structures and features herein. The skilled artisan will be familiar with GPU caches including use for instructions (such as shader programs, compute kernel programs, or portions thereof) and data (such as textures).

With reference again to FIG. 4, CPU 405 is shown bilaterally communicating with CPU memory controller 408a, while GPU 406 is shown bilaterally communicating with GPU memory controller 408b. As known in the art, the memory controllers manage the flow of information to and from memory and are sometimes tasked with maintaining the memory itself (e.g., refresh or other functionality depending upon the type of memory). As shown in FIG. 4, varying embodiments of this disclosure contemplate either a separate memory controller for each of the CPU 405 and GPU 406, or a single controller that performs memory control for both, e.g. memory controller 408. In some embodiments, the memory controllers along with the GPU and CPU are part of an integrated microprocessor package shown as 415 and exemplified by an Intel™ Core i7™. The memory controller(s) 408 are bilaterally coupled to memory 409, which may be divided into CPU memory 409a and GPU memory 409b. Some embodiments of the disclosure use physically or logically independent memory for each of the GPU and CPU, while other embodiments call for sharing memory on a physical or logical basis.

GPU's Relationship to Software

Figure 5:
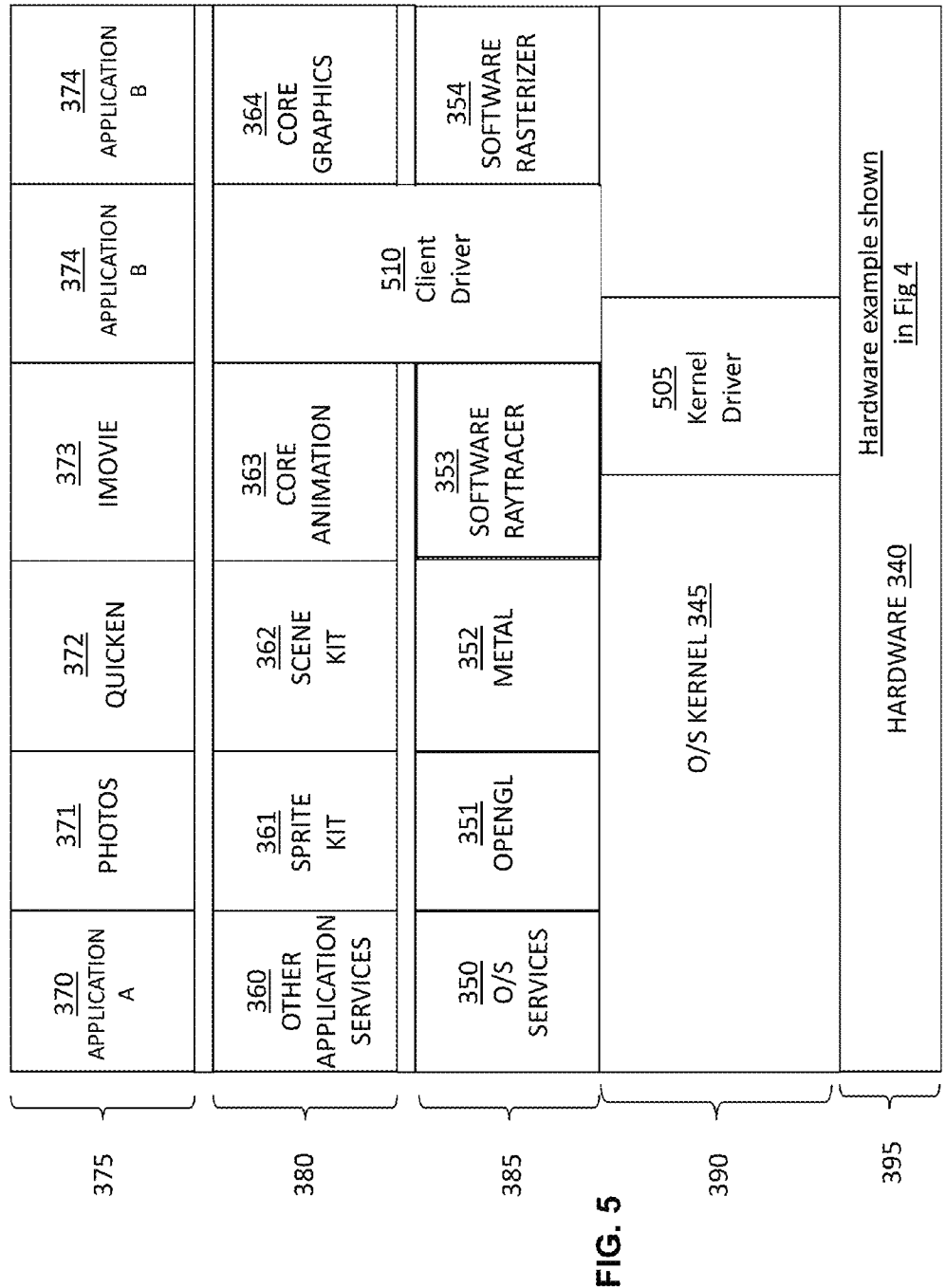
FIG. 5 shows a second software layer architecture associated with some embodiments of the disclosure.

Referring now to FIG. 5, there is shown a version of FIG. 3 adapted to illustrate driver details. Specifically, FIG. 5 shows kernel driver 505 in the operating system kernel and client driver 510 in the framework layers of the operating system, which may also be called user space. Furthermore, hardware 340 is annotated to indicate that the hardware shown in FIG. 4 is an exemplary illustration of the type of hardware that may be embodied in layer 395. As discussed above, the operating system kernel may perform memory management, device management, and system calls, and is often the purview of hardware drivers. In one embodiment, kernel driver 505 is a GPU driver used to manage and communicate with a GPU, such as GPU 406. In one or more embodiments, kernel driver 505 may be an instantiation of a kernel driver that is generated for one or more user space applications, such as a user application (370 through 374), a framework (350's, and 360's) or client driver 510. For example, when iMovie 373 (or an instance of iMovie 373) launches, a kernel driver 505 may be generated to respond to requests originating from iMovie 373. Alternatively, kernel driver 505 may be used for: all the system software interacting with the GPU; one or more frameworks or other software from the operating system services layers 385 and 380; multiple instances of the same or different programs; or, any combination of the foregoing.

Referring again to FIG. 5, there is shown client driver 510, which in some embodiments, represents the user-space portion of the driver associated with the GPU. In some embodiments, client driver 510 functions as a mechanism for user-space applications and other software to use the GPU(s) by communicating at a level of abstraction higher than that provided by the kernel driver or the kernel in general. In addition, in some embodiments, the client driver 510 provides a level of isolation between the kernel (e.g., kernel driver 505) and user space programs, such as application programs in layer 375.

In certain embodiments, the client driver 510 may be an instantiation of a user-space client driver generated for a certain application or multiple instantiations of a certain application. In other embodiments, client driver 510 may provide services for any user application or framework communicating with the GPU from a layer above the kernel. Still in other embodiments, client driver 510 may represent a framework or combination of frameworks that functionally operate as the client driver. For example, Metal™ 352 may functionally operate as the client driver or the combination of Core Animation™ 363, and Metal™ 352 may functionally operate as the client driver.

Referring again to FIG. 5, in some embodiments a user application, for example in layer 375, may wish to access a graphics resource. The graphics resource may be part of any application operation, such as the common activity of sending information to the screen. In order to access the graphics resource, the application may interact with client driver 510. In turn, client driver 510 may interact with kernel driver 505 in order to fulfill the requests from the application. Furthermore, and also in turn, kernel driver 505 may fulfill requests from client driver 510 by interacting with hardware 340 or, by illustrative example, GPU 406.

GPU Virtual Memory and Deterministic Mapping

GPUs support a virtual address space in a manner that is similar to CPUs. For example, in some embodiments, a GPU may have separate address spaces allocated for each process or user-space application. Virtual memory is generally supported by a conversion mechanism that allows for virtual addresses to be converted to real addresses so the correct memory cells may be written or read. One common conversion mechanism is a set of tables, often called page tables. The page tables provide a way to use a virtual address as an index and retrieve a real address. Page tables are ordinarily stored in system memory, such as CPU or GPU memory 409, which may be fashioned with DRAM or any other suitable memory type as discussed above. In some instances, page tables may be either tiered or mirrored so the tables (or portions thereof) are in system DRAM memory (e.g., represented by 409) and in disk memory (not shown in FIG. 4, but alternatively and relatively shown in FIG. 1).

Furthermore, a cache of page table entries may be stored in GPU cache 406*b* so frequently sought addresses may be accessed very quickly.

In order to support the existence of separate virtual address space for each of multiple processes or applications, the GPU virtual address space for each process or application can be reflected in separate page tables. The page table may be in a standard table format, a GPU-supported proprietary format per vendor, or, as in the case of Intel GPUs, the GPU page table format may be the same as the CPU page table format. Similarly, in some embodiments, separate virtual address spaces may be allocated for software other than applications or processes. For example, in some embodiments, there may be separate address spaces for each GPU context.

As discussed above, the CPU and GPU may share memory. Similarly, virtual memory space and the associated page tables (or other conversion mechanisms) can also be shared between CPU(s) and GPU(s) for a process or other software element for which separate page tables are created or used.

In addition, the address of a resource such as a graphics resource may be allocated in a process's GPU virtual address space by a client driver (e.g., 510) to reduce driver patching time and to facilitate submission of work to the GPU from user space without direct kernel intervention by an application process. Moreover, a client application allocated address (for example, via malloc), can be directly used by the GPU by sharing the same page tables used by the CPU or by mirroring the CPU page tables for the GPU. However, in these examples, a resource allocation for a GPU process can be determined predictably from one process invocation to the next. The same issue exists in many situations and for many types of resources when a GPU driver maps resources (for example, frame buffers, context status pages, CPU map-able resources in PCIe aperture, etc.) into the virtual address space kept by the GPU for a process. This mapping provides a deterministic location for these resources so every invocation of the process results in the same virtual addresses for a given resource. These deterministic locations may create undesired vulnerabilities by allowing any type of defective or malicious software to predict resource locations and access those resources. For example, protected movie frames may be copies in digital format by predicting the location of a render target and reading from that location.

Randomizing GPU Resources

Some embodiments of this disclosure seek to mitigate the vulnerabilities discussed above by providing randomization of the resource layout within GPU-related virtual address space (e.g., the virtual address space of a process for the GPU). In some embodiments, randomization is provided by using a randomized effective virtual address in place of the normal allocated virtual address.

Figure 6:
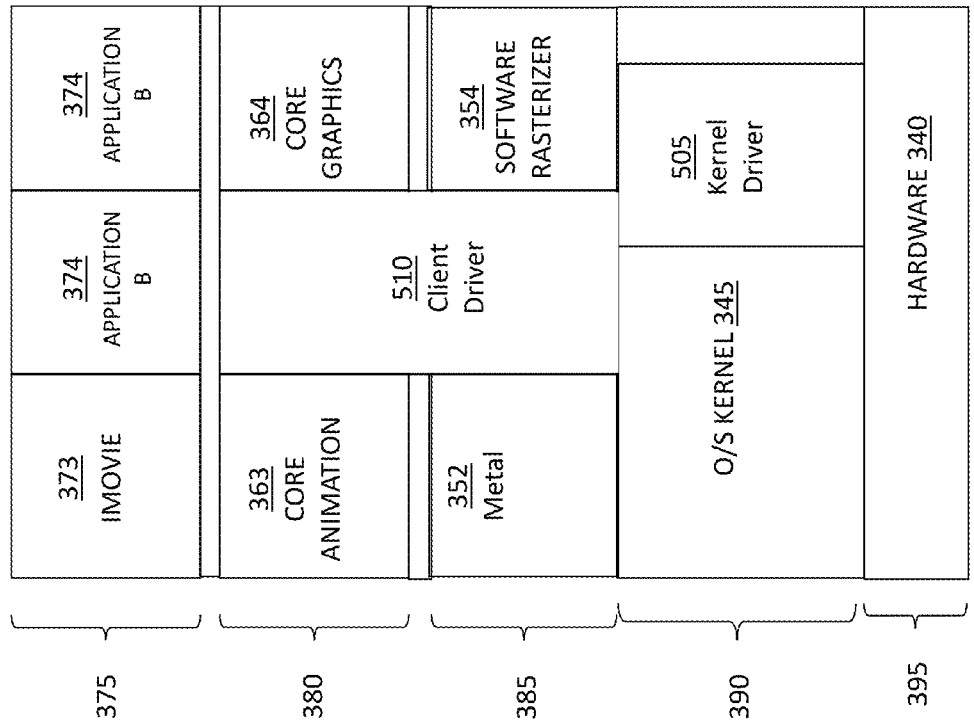
FIG. 6A shows a process associated with embodiments of the disclosure.
FIG. 6B shows a third software layer architecture associated with some embodiments of the disclosure.

With reference to FIG. 6A, there is shown a process for randomizing resource locations in memory that is consistent with certain embodiments of this disclosure. At 601, a process or application requests allocation of a GPU-related resource, such as a texture, a buffer, or a render target. In many embodiments the request may be made by a process associated with a user application program, for example, a program at level 375 of FIG. 6B. However, any software either local to the host system (e.g., layers 375, 380, or 385 from FIG. 6B) or over a network may make the request. Furthermore, a requested resource may be any resource destined for the GPU's virtual memory space, including for example, a texture, a buffer (e.g., frame buffer, vertex buffer, etc.), a context status page, a render target, or any CPU map-able resources, such as a PCIe aperture or a CPU allocated buffer that is remapped to a GPU. Referring now to part 602, a virtual address is allocated in association with the resource request 601. In some embodiments the recipient software of the allocated address is the software that requested the allocation. In other embodiments, however, different software will receive the allocated address. For example, requests typically cascade in the software structure, so if an application program, such as application B 374, requests a texture allocation from client driver 510 or from Metal 352, the request recipient may fulfill the request by sending its own request to a lower level of software. For this example, client driver 510 or Metal 352 may pass an allocation request to software in the operating system kernel, such as kernel driver 505. The kernel driver 505 may respond to client driver 510 or Metal 352 with an allocated address, after which client driver 510 or Metal 352 will respond to the application process by providing a texture handle. Thus, while the application requests allocation of the resource, the allocated address may never be returned to the application, which instead receives a handle.

The allocated virtual address may be referred to herein as the allocated address or $Address_{ALLOC}$. In some embodiments, the allocated address is the address allocated by the GPU memory manager unit, which may be a hardware component or software operating as or within a GPU driver. In certain embodiments, a graphics driver, such as kernel driver 505 and/or client driver 510 (e.g., working together as a single graphics driver), conveys the allocated address into the kernel, and then conveys the allocated address or a substitute for that address to the GPU, usually as part of a command buffer.

Referring again to FIG. 6A, when the application process makes a request to use the allocated graphics resource, the allocated address may be used 603 by the service software (e.g., a client driver 510 or framework software 352) to access the requested resource or for any other reason. At part 604, the allocated address is transformed to an effective address. An effective address (also referred to herein as $Address_{EFF}$) is the transformed form of the allocated address, where the transformation randomizes the resource location in the virtual address space or otherwise provides indirection between the allocated virtual memory address and the effective virtual memory address. The transformation between allocated address and effective address may take any useful form that provides randomness or indirection as to the resource location within virtual memory. In many embodiments, the randomness or indirection occurs between one instantiation of the process that requested the resource and another instantiation of the same process. In other words, for each instantiation of the resource-requesting process, the effective address of the resource will not reliably be the same as the effective address for prior instantiations. Some examples of transformation techniques are:

add a slide value to each allocated address to form an effective address;

add a randomly selected slide value to each allocated address to form an effective address (note that, unless otherwise stated, all references to random values include pseudo-random values, for example, generated by a computer algorithm);

add a slide value to each allocated address to form an effective address, where the slide value depends upon a GPU context ID (i.e., a randomly selected slide value where the random selection process is governed by the data regarding the current GPU context, such as the context ID);

add a slide value to each allocated address to form an effective address, where the slide value depends upon a command buffer submission ID (i.e., a randomly selected slide value where the random selection process is governed by the data regarding the current command buffer submission, such as the submission ID);

add a slide value to each allocated address to form an effective address, where the slide value depends upon a temporal indication (i.e., a randomly selected slide value where the random selection process is governed by the current time and/or date);

produce an effective address that is a function of the allocated address and one or more of GPU context information such as context ID, GPU command buffer submit information such as a submit ID, a temporal indication such as the time or date, or any other value obtainable by the system.

produce an effective address that is a function of the allocated address and one or more values obtained from system sensors (discussed above).

Referring again to FIG. 6A, once an effective address is obtained at 604, the effective address may be submitted to the GPU for use. Notably, in some embodiments, the processes in user-space (i.e., layers 375, 380, and 385) operate with the allocated address, while the processes in kernel space (i.e., layer 390) use the effective address. In other embodiments, the transformation from allocated address to effective address may occur within the GPU by using software stored in the GPU firmware. For example, the transformation may occur by the alteration of page tables, or by the use of GPU firmware running on one or more execution units of the GPU. Furthermore, in some embodiments the transformation may be executed by the GPU as part of a compute kernel or shader operation. When employing an embodiment that confines transformation to the GPU (e.g., using firmware or the alteration of page tables), the effective address may only be exposed to hardware, so no level of software is aware of the actual resource locations in virtual memory.

Example of Adding an Address Slide or Transformation

Figure 7:
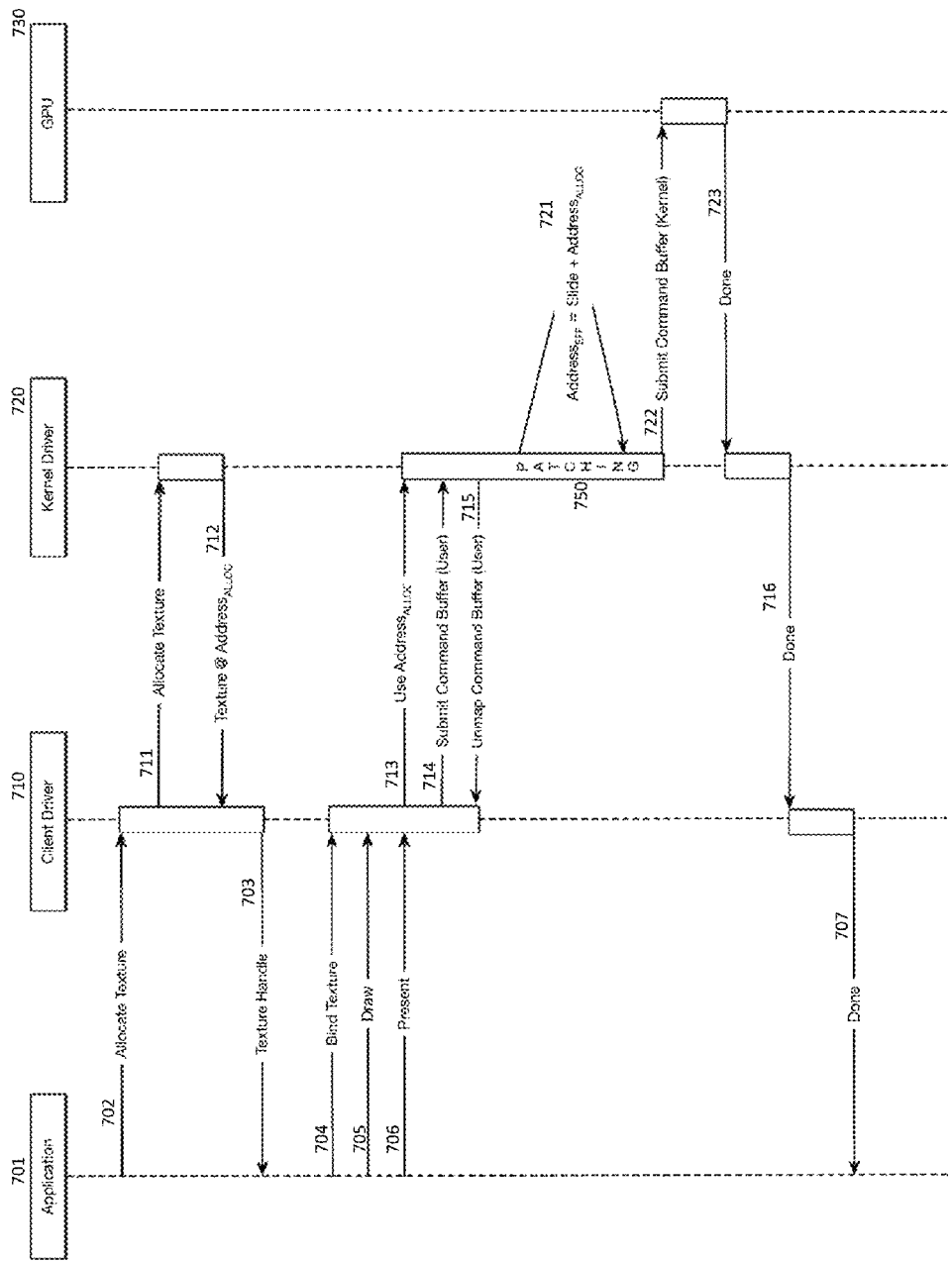
FIGS. 7-11 show hardware and software arrangements in conjunction with processes associated with some embodiments of the disclosure.

Referring to FIG. 7, there is shown a process illustrating interaction between and among software elements and hardware in order to randomize resource locations in virtual memory. Because FIG. 7 is similar to FIGS. 8-11, some discussion with respect to FIG. 7 regarding options and alternatives may be omitted for efficiency. The skilled artisan will readily apply discussion from one figure to another. Referring to FIG. 7, there is shown a process illustrating interaction between and among software elements and hardware in order to randomize resource locations in virtual memory. In particular, the example of FIG. 7 shows the application of a slide value to an allocated virtual address to form an effective virtual address, where the slide value is determined for each applicable process. With reference to FIG. 7, there is shown application process 701 that requests allocation of a resource 702 (shown as a texture, which represents any GPU-related resource). The application may be a user application as indicated in FIG. 7 or in some embodiments, may be window manager or other software, for example frameworks or operating system resources.

The allocation request 702 is sent to lower level software, which is exemplified in FIG. 7 as a client driver 710 (e.g., the client driver represents software that may be an actual driver, a graphics framework such as 351 or 352 in FIG. 3, or any other software providing the relevant services to the user-level process). In one embodiment, the client driver 710 is a user-space portion of a GPU driver that is instantiated for the application 701. As shown in FIG. 7, after receiving the request, the client driver 710, in turn, requests a texture allocation 711 from a kernel driver 720. Depending upon the embodiment, the kernel driver may be a driver for the GPU that runs in the operating system kernel, in some embodiments, and instantiated solely for the application 701. As shown at 712, the kernel driver 720 responds by providing a virtual address 712 for the allocated texture. In some embodiments, the memory allocation manager portion of the kernel driver is responsible for generating the virtual address. At 703, after receiving the allocated address, the client driver, in turn and potentially among other things, returns a texture handle 703 to the application 701 (e.g., a handle based upon the allocated address 712). In many embodiments, the actual allocated address 711 is not returned to the application 701 as part of the texture handle 703, but in some embodiments the allocated address 712 may be returned as such.

Sometime after the texture handle is received by the application 701, the application may wish to create or change elements for display and the texture handle 703 may be used at that time. In the illustrated example, the application 701 affects the display by requesting that the client driver 710: bind the texture 704, draw 705 an associated item, and present the item 706. In turn, the client driver 710 uses the allocated address 713 and submits a command buffer 714 for execution by the GPU 730. In some embodiments, after receiving the command buffer, the kernel driver 720 responds to the client driver 710 with a request to un-map the command buffer 715. The command buffer may be un-mapped from user space to prevent any user space software from accessing it or tampering with it.

As shown in FIG. 7, the use of the allocated address by the kernel driver 720 may employ a slide to create an effective address. In particular, at patching portion 750, there is a transformation of the allocated address to an effective address. While the transformation may take any suitable form, in at least one embodiment the transformation adds a slide value according to the following equation:

$$\text{Address}_{EFF} = \text{slide} + \text{Address}_{ALLOC}$$

As indicated above, the slide may be determined in any known way, such as through an operating system resource call for a number or a random number. However, in some embodiments, the slide value is a constant that is determined randomly for each instantiation of an application process 701. For example, in some embodiments, each instantiation of an application process (or other software that requests a GPU-related resource) is assigned a slide value to be used to create effective addresses for submission to the GPU. In one or more embodiments, if more than one application (or multiple instantiations of the same application) access the GPU drivers (e.g., 710 and 720), then each application will have its own slide value. In one or more embodiments, the slide value is determined randomly so as to prevent its prediction from one instantiation of the application process to another. In other embodiments, the slide value may be determined in other ways, however, in most embodiments, the determination of the slide should not be predictable or easily predictable by other software.

In some embodiments care may be taken to ensure that different resources are not assigned duplicative or overlapping effective addresses (e.g., if the slide is randomly generated, it may be possible that two different randomly selected slides have values that cause a duplicate or overlapping effective addresses). In some embodiments, duplicative or overlapping addresses can be avoided by altering the mechanism for creating the slide value. For example, in some embodiments, software or hardware may be fashioned (either separately or in the memory controller or GPU) to generate slide values that will not cause duplicative or overlapping addresses. This may be accomplished with special algorithms or by other techniques that prevent duplications over a range of values or segment ranges for each resource. Alternatively, rather than control the generation of slide values to ensure the absence of duplicative or overlapping addresses, slide values may be created by existing operating system resources (e.g., random number generator), and prior to using the slide values, a CPU processor or a GPU compute kernel may be used to check whether the slide will create duplicative or overlapping addresses for resources in the applicable virtual memory space. If a particular slide fails the checking process, then subsequent new slides may be generated until an acceptable slide is found.

In addition, the slide value may be applied to the allocated address in any suitable manner, and need not be applied as shown in the above equation (simply by a process of mathematical addition, as shown in FIG. 7). For example, the slide value can be used as a seed or salt for a function that determines an effective address from the allocated address. Furthermore, the varying embodiments of the disclosure call for different engines to perform the transformation of the allocated address into the effective address. For example, with reference to FIG. 4, the transformation work may be performed by the CPU, the GPU (e.g., as part of a compute kernel operation), or specialized hardware, such as a software or hardware adaptation to the memory controller 408c or GPU 406c. In some embodiments, GPUs may be unable to perform the transformation using a compute kernel due to a requirement of pre-existing addresses to execute the compute kernel. For these embodiments, alterations may be made to the GPU firmware or hardware such that the function 721 can be run on the GPU. For example, the transformation function may be hard-wired into custom hardware or GPU firmware.

Referring again to FIG. 7, after transforming the allocated address(es) into effective address(es), the kernel driver 720 submits a command buffer 722 to the GPU 730, such that the GPU maps the resource(s) in question to effective address(es) rather than allocated address(es). Thus, the GPU operates on the effective addressing, while the user space software operates on the allocated addressing, and the kernel driver functions as a translational intermediary. The operation completes as indicated at 723, 716, and 707.

As suggested by the diagraming in FIG. 7, in a minimum configuration, some embodiments of FIG. 7 may be implemented on existing systems simply by updating the kernel driver and, in particular, the memory allocation portion of the kernel driver. For example, the kernel driver 720 or other memory management software may be altered to generate the effective addresses as described. Note that the foregoing example with respect to FIG. 7 is illustrated in the form of a texture allocation and draw command that invokes the process resulting in the insertion of the address slide. However, the same technique may be used for any GPU-oriented resource, such as buffers, render targets, etc.

In an alternative embodiment relating to the process of FIG. 7, the software for performing the transformation operation may be moved from the kernel driver to the GPU firmware. Thus, allocated addresses might be provided to the GPU, and the transformation of allocated addresses to effective address may occur entirely in the GPU. This alternative embodiment would confine the use of effective addressing to within the hardware. Furthermore, the alternative embodiment might minimally be installed on an existing system by flashing the GPU firmware to perform the functions and tasks as discussed.

Example of Per Context Address Transformation

Figure 8:
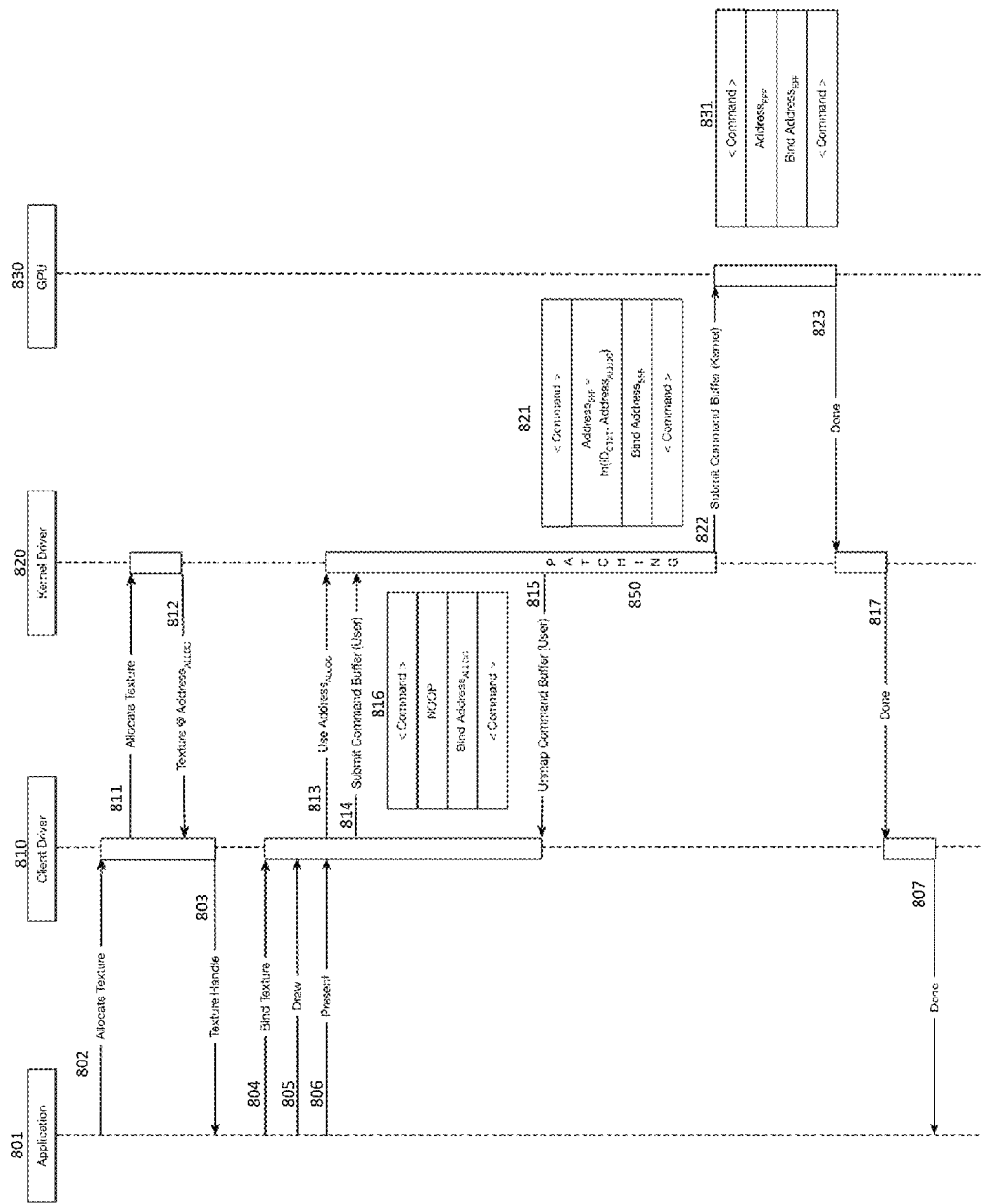

With reference to FIG. 8, in some embodiments of the disclosure, the GPU 830, the kernel driver 820, or the GPU firmware 406a may be configured to transform an allocated address into an effective address, where the transformation is based on a GPU context ID and/or potentially a random number. In particular, in some embodiments, each GPU context may have a different transformation function from other GPU contexts for the same process. Referring to FIG. 8, there is shown another process illustrating interaction between and among software elements and hardware in order to randomize resource locations in virtual memory. Because FIG. 8 is similar to FIGS. 7 and 9-11, some discussion with respect to FIG. 8 regarding options and alternatives may be omitted for efficiency. The skilled artisan may review the discussions regarding FIGS. 7-11 and recognize that many concepts discussed with respect to one figure may apply in some or all of the others.

The example of FIG. 8 shows the use of a function to transform the allocated virtual address into an effective virtual address, where the function bears an argument arising from the GPU context. Since a process such as application process 801 may have multiple GPU contexts, the current embodiments may each employ multiple different effective address transformations for the same process 801. This provides greater randomization of the resource locations within the virtual address space.

With reference to FIG. 8, there is shown application process 801 that requests allocation of a resource 802. The application 801 may be a user application as indicated in FIG. 8 or, in some embodiments, may be a window manager or other software, for example frameworks or operating system resources (see FIGS. 3 and 5 for examples).

The allocation request 802 is sent to lower level software, which is shown in FIG. 8 as a client driver 810. As discussed above, the client driver represents several software possibilities as discussed above or below. As shown in FIG. 8, after receiving the request, the client driver 810, in turn, requests a texture allocation 811 from a kernel driver 820. Variations of the kernel driver are discussed both above and below and the reader is referred thereto. As shown at 812, the kernel driver 820 responds by providing a virtual address 812 for the allocated texture. At 803, after receiving the allocated address, the client driver, in turn, returns a texture handle 803 to the application 801 (e.g., a handle may be based upon the allocated address 812 in certain embodiments).

Sometime after the texture handle is received by the application 801, the application may wish to create or change elements for display, employing the texture handle 803 at that time. In the illustrated example, the application 801 requests the client driver: bind the texture 804; draw an item 805; and present the item 806. In turn, the client driver 810 uses the allocated address 813 and submits a command buffer 814, 816 for execution by the GPU 830. In some embodiments, after receiving the command buffer, the kernel driver 820 responds to the client driver 810 with a request to un-map the command buffer 815.

As shown in FIG. 8, at patching portion 850, there is a conversion of the allocated address to an effective address, where conversion occurs according to the following equation:

$$\text{Address}_{EFF} = fn(\text{ID}_{CTXT}, \text{Address}_{ALLOC})$$

Where $\text{ID}_{CTXT}$ is the ID for the GPU context;

Depending upon the embodiment, fn can any suitable function, for example:

$$fn(\text{salt}, \text{Address}_{ALLOC}) = (\text{salt} * n) + \text{Address}_{ALLOC}$$

Where salt is a random number and n can be a number chosen to achieve maximum randomization based on number of effective address bits; and the salt or random number may be determined in any known way, such as through an operating system resource call for a number or a random number.

In some embodiments the context ID may be an actual ID assigned to each GPU context, while in other embodiments it may be a value or values derived from the context ID or data relating to the GPU context itself (e.g., based upon values within the GPU context). Furthermore, varying embodiments of the disclosure call for different engines to perform the transformation of the allocated address into the effective address. For example, with reference to FIG. 4, the transformation work may be performed by the CPU, the GPU, or specialized hardware, such as a software or hardware adaptation to the memory controller 408c or GPU 406c.

Furthermore, in some embodiments, fn may itself be a randomizing function such as a pseudo hash function that is reversible. In general, for some embodiments, it is desirable to choose a function that creates less predictable results. However, since there may be multiple GPU contexts relating to a single virtual memory space, some care may be given, in certain embodiments, to preventing the creation of duplicative or overlapping effective addresses (e.g., if the effective address is randomly generated, it may be possible that two different randomly generated addresses cause different resources to have overlapping effective addresses). Embodiments regarding the care that may be taken are discussed above and below.

Referring again to FIG. 8, after transforming the allocated address(es) into effective address(es), the kernel driver 820 submits the command buffer 821, 822 to the GPU 830, such that the GPU operates using the effective addressing. Thus, the GPU operates on the effective addressing, while the user space software operates on the allocated addressing, and the kernel driver functions as a translational intermediary. As suggested in the command buffer diagram 821, in some embodiments, the functional calculation of the effective address may be part of the command buffer (e.g., as part of a compute kernel operation or via commands from the kernel driver). In other embodiments, the effective address may be calculated by software such as the memory allocation software (e.g., MMU) in the kernel driver 820 or other software. As another alternative embodiment, the effective address calculation may be made via: specialized hardware in the GPU that is firmware-programmed to run the selected function; and/or specialized hardware in the GPU that is hard-wired to run a randomizing function or other function; and/or the use of firmware in the GPU, which can be updated (e.g., by flashing) to including the desired function. For example, in an alternative embodiment relating to the process of FIG. 8, the software for performing the transformation operation may be moved from the kernel driver to the GPU firmware. These alternative embodiments would confine the use of effective addressing to within the hardware. Furthermore, the alternative embodiment might minimally be installed on an existing system by flashing the GPU firmware.

As shown in FIG. 8, the operation completes as indicated at 823, 817 and 807.

Similar to the embodiments discussed above, in a minimum configuration, some embodiments of FIG. 8 may be implemented on existing systems simply by updating the kernel driver and, in particular, the memory allocation portion of the kernel driver. Furthermore, as discussed above, the use of a texture as the GPU resource in the example of FIG. 8 is intended to illustrate that the same hardware, software, and process may be used to produce the same or similar results with any resource.

Regarding the embodiments of FIG. 8, alternatives to the embodiments discussed above may perform the address transformation based upon any value that can be implicitly derived in secure execution domains (kernel and GPU). As yet another alternative, the client driver 820 may insert pseudo commands in the GPU command stream before every resource reference (or) as a command preamble per batch submission. These pseudo commands can be updated with the address calculation equation in GPU kernel driver or firmware to derive the effective address before execution. In some embodiments, GPUs may use indirect resource references through multi level indirection for the effective address. In yet other embodiments, only first level addresses are transformed and thereby obfuscated.

Example of Per Submission Address Transformation

Figure 9:
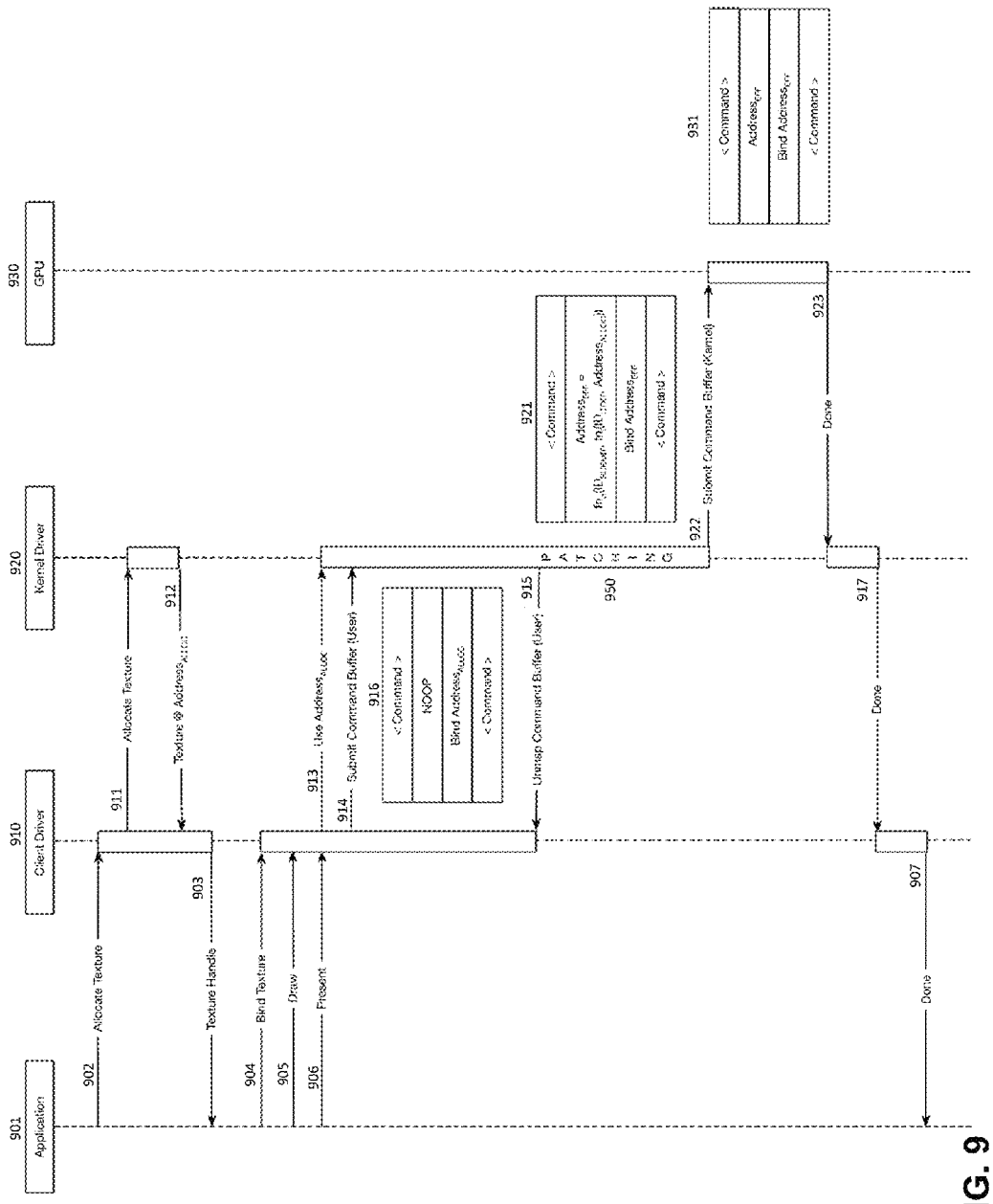

With reference to FIG. 9, because FIG. 9 is similar to FIGS. 7, 8, 10, and 11, some discussion with respect to FIG. 9 regarding options and alternatives may be omitted for efficiency. The skilled artisan may review the discussions regarding FIGS. 7-11 and recognize that many concepts discussed with respect to one figure apply in some or all of the others. With reference to FIG. 9, in some embodiments of the disclosure, the GPU 930, kernel driver 920, or GPU firmware 406a may be configured to transform an allocated address into an effective address, where the transformation is based on a command buffer 916, 921, 931 submission ID. In particular, various embodiments of the disclosure use a different transformation function for each command buffer submission and, in some embodiments, incorporate the submission ID or a related value as an argument in the transformation function.

The example of FIG. 9 shows the use of one or more functions to transform the allocated virtual address into an effective virtual address, where the one or more functions bear an argument arising from the command buffer submission ID. In particular, the sample transformation function used in this example is shown in the command buffer 921, and relies on the submission ID ($ID_{SUBMIT}$), the context ID ($ID_{CTXT}$) and the allocated address ($Address_{ALLOC}$). Of course, varying embodiments of the disclosure may employ a function relying on any number of variables or arguments, and some embodiments may employ a function that relies only on submission ID and allocated address.

Because a process such as application process 901 may be associated with multiple command buffer submissions, the current embodiments may employ multiple different effective address transformations with respect to the same virtual address space. The use of separate transformations for each command buffer submission provides a high degree of randomization of resource locations within the virtual address space.

With reference to FIG. 9, there is shown application process 901 that requests allocation of a resource 902. The allocation request 902 is sent to lower level software, which is shown in FIG. 9 as a client driver 910. As shown in FIG. 9, after receiving the request, the client driver 910, in turn, requests a texture allocation 911 from a kernel driver 920. As shown at 912, the kernel driver 920 responds by providing a virtual address 912 for the allocated texture or resource. In some embodiments, the memory allocation manager portion of the kernel driver 920 may be responsible for generating the allocated virtual address. At 903, after receiving the allocated address, the client driver returns a texture handle 903 to the application 901. As an example, the texture handle may be a value to identify the texture and may be based upon the allocated address 912.

Sometime after the texture handle is received by the application 901, the application may use texture handle 903 as part of an operation to generate or change information for display. In the illustrated example of FIG. 9, the application 901 binds the texture 904 and issues a draw request 905 and a present request 906 to the client driver 910. In turn, the client driver 910 uses the allocated address 913 and submits a command buffer 914, 916 through the kernel driver 920 for execution by the GPU 930. In some embodiments, after receiving the command buffer, the kernel driver 920 responds to the client driver 910 with a request to un-map the command buffer 915.

As shown in FIG. 9, at patching portion 950, there is a transformation of the allocated address to an effective address, where transformation occurs according to the following equation:

$$Address_{EFF}=fn_0(ID_{SUBMIT}, fn_i(ID_{CTXT}, Address_{ALLOC}))$$

Where $fn_0$ and $fn_i$ can be any selected functions as discussed herein, e.g.:

$$fn_0(ID_{SUBMIT}, fn_i(ID_{CTXT}, Address_{ALLOC}))=(salt*m)+(ID_{SUBMIT}*n)+(ID_{CTXT}*n)+Address_{ALLOC}$$

Where: $ID_{CTXT}$ represents a value based upon the context ID, $ID_{SUBMIT}$ represents a value based upon the command buffer submission ID; salt represents a random number; and m and n may be numbers chosen to get maximum randomization based on number of effective address bits.

As suggested above, in some embodiments the $ID_{SUBMIT}$ and the $ID_{CTXT}$ may be actual IDs assigned to each command buffer submission or GPU context respectively. However, in other embodiments the $ID_{SUBMIT}$ and the $ID_{CTXT}$ may each be a value or values derived from the submission ID or the context ID respectively, or even data relating to the command buffer submission itself or the GPU context itself. Furthermore, and as discussed above, varying embodiments of the disclosure call for different engines to perform the transformation of the allocated address into the effective address. For example, with reference to FIG. 4, the transformation work may be performed by: the CPU using software associated with the kernel driver; the GPU using software associated with the kernel driver or, in some embodiments, as part of a compute kernel operation; or specialized hardware, such as a software or hardware adaptation to the memory controller 408c or GPU 406c. In the case of specialized hardware 408c or 406c, some embodiments envision hardware that is hard wired to execute a function.

Furthermore, in some embodiments $fn_0$ and/or $fn_i$ may themselves be randomizing functions such as a pseudo hash function that is reversible. Moreover, while the sample function above ($Address_{EFF}=fn_0(ID_{SUBMIT}, fn_i(ID_{CTXT}, Address_{ALLOC}))$) is given as nested functions with both outer and inner functions, varying embodiments contemplate the use of a single function or multiple functions (nested or not) as appropriate for the desired results. In general, for some embodiments, it is desirable to choose a function or functions that creates less predictable results. Notwithstanding the use of both $ID_{SUBMIT}$ and $ID_{CTXT}$ in the sample function given above, varying embodiments of the disclosure contemplate functions depending on any number of variable including only $ID_{SUBMIT}$ and $Address_{ALLOC}$.

Because there may be multiple submission IDs and GPU contexts relating to a single virtual memory space, some care may be given, in certain embodiments, to preventing the creation of duplicative or overlapping effective addresses; the reader is referred to the discussions above and below for greater detail.

Referring again to FIG. 9, in some embodiments, after transforming the allocated address(es) into effective address(es), the kernel driver 920 submits the command buffer 921, 922 to the GPU 930, such that the GPU operates using the effective addressing. Thus, for these embodiments, the GPU operates on the effective addressing, while the user space software operates on the allocated addressing, and the kernel driver functions as a translational intermediary. As suggested in the command buffer diagram 921, in some embodiments, the functional calculation of the effective address may be part of the command buffer. In other embodiments, the effective address may be calculated by software such as the memory allocation software in the kernel driver 920 or other software. As another alternative embodiment, the effective address calculation may be made via: specialized hardware in the GPU 406c that is firmware-programmed to run the selected function; and/or specialized hardware in the GPU 406c that is hard-wired to run a randomizing function or other function; and/or the use of firmware in the GPU, which can be updated (e.g., by flashing) to include the desired function. For example, in an alternative embodiment relating to the process of FIG. 9, the software for performing the transformation operation may be moved from the kernel driver to the GPU firmware. This alternative embodiment would confine the use of effective addressing to within the hardware. Furthermore, the alternative embodiment might minimally be installed on an existing system by flashing the GPU firmware.

As shown in FIG. 9, the operation completes as indicated at 923, 917, and 907.

As suggested by FIG. 9, in a minimum configuration, some embodiments of FIG. 9 may be implemented on existing systems simply by updating the kernel driver and, in particular, the memory allocation portion of the kernel driver. Note that the foregoing example regarding a texture as the sample resource is contemplated as applicable for any resource.

Regarding the embodiments of FIG. 9, alternatives to the embodiments discussed above may perform the address transformation based upon any value that can be implicitly derived in secure execution domains (kernel and GPU). As yet another alternative, the client driver 910 may insert pseudo commands in the GPU command stream before every resource reference (or) as a command preamble per batch submission. These pseudo commands can be updated with the address calculation equation in a GPU kernel driver or firmware to derive the effective address before execution. In some embodiments, GPUs may use indirect resource references through multi-level indirection for the effective address. In yet other embodiments, only first level addresses are transformed and thereby obfuscated.

Example of Per Resource Address Sliding

Figure 10:
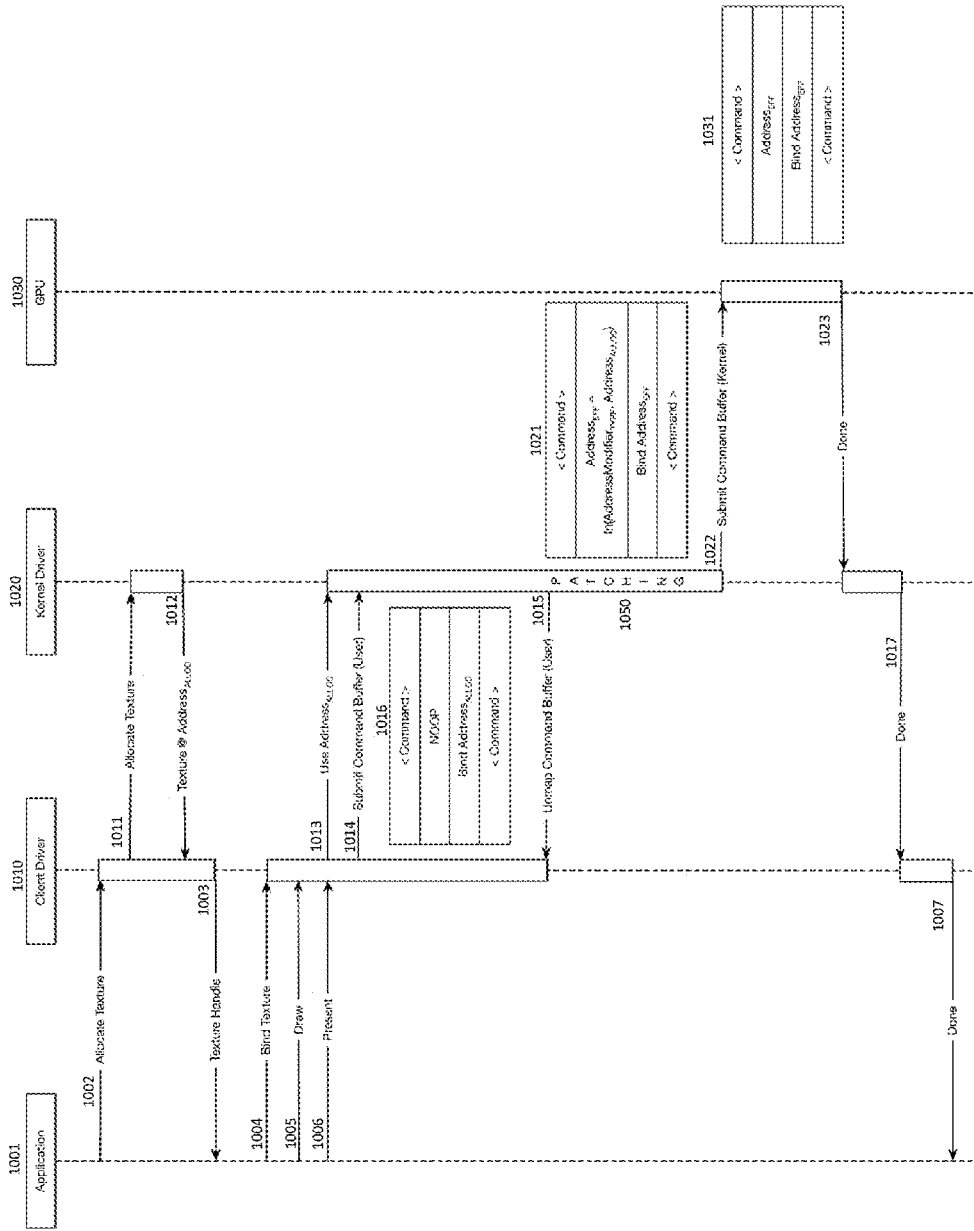

With reference to FIG. 10, because FIG. 10 is similar to FIGS. 7-9 and 11, some discussion with respect to FIG. 10 regarding options and alternatives may be omitted for efficiency. The skilled artisan may review the discussions regarding FIGS. 7-11 and recognize that many concepts discussed with respect to one figure apply in some or all of the others. With reference to FIG. 10, in some embodiments of the disclosure, a computing resource such as the GPU kernel driver 1020 or GPU firmware 406a may be configured to transform an allocated address into an effective address, where the transformation is based on a particular allocated resource or the "type" of the particular allocated resource. For example, in some embodiments, each resource may use its own transformation that is different than any other resource sharing the same virtual memory space. In another example, resources are categorized by type, and for each type of resource a different transformation may be applied.

Referring to FIG. 10, there is shown a process illustrating interaction between and among software elements and hardware in order to randomize resource locations in virtual memory. In particular, the example of FIG. 10 shows the use of a function (e.g., as shown in command buffer 1021) to transform the allocated virtual address into an effective virtual address, based upon the resource allocated or the type of resource allocated. By basing transformation upon a resource type, the arrangement can seek to protect (e.g., by randomizing) only resource types that are vulnerable. For example, a render target or texture buffer may include protectable images, so in some embodiments, those resource types will require a randomizing effective address transformation. By contrast, for some embodiments, resources such as shaders, GPU kernels, linear buffers (e.g., vertex, index, constant buffers, etc.), or motion vectors do not generally contain sensitive data, so no randomizing effects may be necessary. Therefore, in some embodiments, a randomization is applied for render targets, textures, and/or client buffers, while other resources are converted from allocated address to effective address with a simple 1 to 1 mapping. In alternative embodiments where individual resources may be flagged to determine the sensitivity of the resource, the resource flags may be used to determine whether or not to randomize the effective memory address for each individual resource.

The current embodiments, where randomization is based upon resource type or other resource factors, may be readily combined with the other embodiments discussed herein with respect to FIGS. 7, 8, 9, and 11. For example, randomization may be imposed based upon context ID or command buffer submission, and a second layer of protection may be applied by further randomizing for each of certain identified resource types. By layering two types of randomization, greater security may be realized.

Because a process such as application process 1001 may be associated with many resources such as render targets and client buffers, the current embodiments may employ multiple different effective address transformations with respect to the same virtual address space. The use of separate transformations for each resource or resource type provides a high degree of randomization of resource locations within the virtual address space, but only where the randomization is required or desired. This conserves processing resources, such as GPU time and energy, while maintaining a very high degree of security.

With reference to FIG. 10, there is shown application process 1001 that requests allocation of a resource 1002 (shown as a texture, which represents any GPU-related resource). The allocation request 1002 is sent to lower level software, which is shown in FIG. 10 as a client driver 1010. As shown in FIG. 10, after receiving the request, the client driver 1010, in turn, requests a texture allocation 1011 from a kernel driver 1020. As discussed above, the kernel driver 1020 represents multiple variations. As shown at 1012, the kernel driver 1020 responds by providing a virtual address 1012 for the allocated texture or resource. The virtual address may be generated in all the variations discussed above. At 1003, after receiving the allocated address, the client driver returns a texture handle 1003 to the application 1001. The texture handle used for these embodiments is similar to those discussed above.

Sometime after the texture handle is received by the application 1001, the application may use texture handle 1003 as part of an operation to generate or change information for display. In the illustrated example of FIG. 10, the application 1001 binds the texture 1004 and issues a draw request 1005 and a present request 1006 to the client driver 1010. In turn, the client driver 1010 uses the allocated address 1013 and submits a command buffer 1014, 1016 through the kernel driver 1020 for execution by the GPU 1030. In some embodiments, after receiving the command buffer, the kernel driver 1020 responds to the client driver 1010 with a request to un-map the command buffer 1015.

As shown in FIG. 10, at patching portion 1050, there is a transformation of the allocated address to an effective address, where transformation occurs according to the following equation:

$$Address_{EFF}=fn(AddressModifier_{TYPE}, Address_{ALLOC})$$

Where:

AddressModifier$_{TYPE}$ is an address modifier value derived from a lookup table such as Table 1 below;

fn may be any function, such as an algebraic function depending on the address modifier and the allocated address (e.g., fn(mod,Address$_{ALLOC}$)=mod/Address$_{ALLOC}$);

TYPE indicates an identification of a resource type, which may be (i) derived implicitly; (ii) determined based upon tags in the command string; or (iii) determined based upon a new type of tag used to support embodiments hereunder.

TABLE 1

AddressModifier$_{RT}$ = 0x0000100000000000
AddressModifier$_{TEX}$ = 0x0000200000000000
AddressModifier$_{BUF}$ = 0x0000000000000000

Key for Table 1:
RT indicates that the AddressModifier is for a resource type "Render Target"
TEX indicates that the AddressModifier is for a resource type "Texture"
Buff indicates that the AddressModifier is for a resource type "Client Buffer."

As shown above, in some embodiments, the values for AddressModifier$_{TYPE}$ may be obtained or derived from a table, link list, or other data structure useful for lookup operations. In other embodiments, a function may be used without a lookup table, for example by incorporating values for each AddressModifier$_{TYPE}$ and inserting a 0 for those that are not applicable in a particular instantiation. Furthermore, in some embodiments, fn may itself be a randomizing function such as a pseudo hash function that is reversible. Moreover, for some embodiments, it is desirable to choose a function that creates less predictable results.

As discussed above, varying embodiments of the disclosure call for different engines to perform the transformation of the allocated address into the effective address and the reader is referenced to the discussion above for more detail.

As with the prior examples, resource-based randomization creates the possibility of overlapping or duplicative effective addresses in the same virtual memory space. A discussion of this issue is given above and the reader is directed thereto for further detail. Furthermore, the same solutions apply where resource-based randomization is combined with another technique, such as those related to context ID or submission ID.

Referring again to FIG. 10, in some embodiments, after transforming the allocated address(es) into effective address(es), the kernel driver 1020 submits the command buffer 1021, 1022 to the GPU 1030, such that the GPU operates using the effective addressing. Thus, for these embodiments, the GPU operates on the effective addressing, while the user space software operates on the allocated addressing, and the kernel driver functions as a translational intermediary. As suggested in the command buffer diagram 1021, in some embodiments, the functional calculation of the effective address may be part of the command buffer. In other embodiments, the effective address may be calculated by the GPU running software such as the memory allocation software in the kernel driver 1020 or other software. As another alternative embodiment, the effective address calculation may be made via specialized hardware as discussed above. For example, in an alternative embodiment relating to the process of FIG. 10, the software for performing the transformation operation may be moved from the kernel driver to the GPU firmware. This alternative embodiment would confine the use of effective addressing to within the hardware. Furthermore, the alternative embodiment might minimally be installed on an existing system by flashing the GPU firmware.

As shown in FIG. 10, the operation completes as indicated at 1023, 1017, and 1007.

As suggested by FIG. 10, in a minimum configuration, some embodiments of FIG. 10 may be implemented on existing systems simply by updating the kernel driver and, in particular, the memory allocation portion of the kernel driver. Note that the foregoing examples with respect to FIG. 10 are not limited to use of a texture, and the teaching apply to any resource.

Example of Using Altered Page Tables

Figure 11:
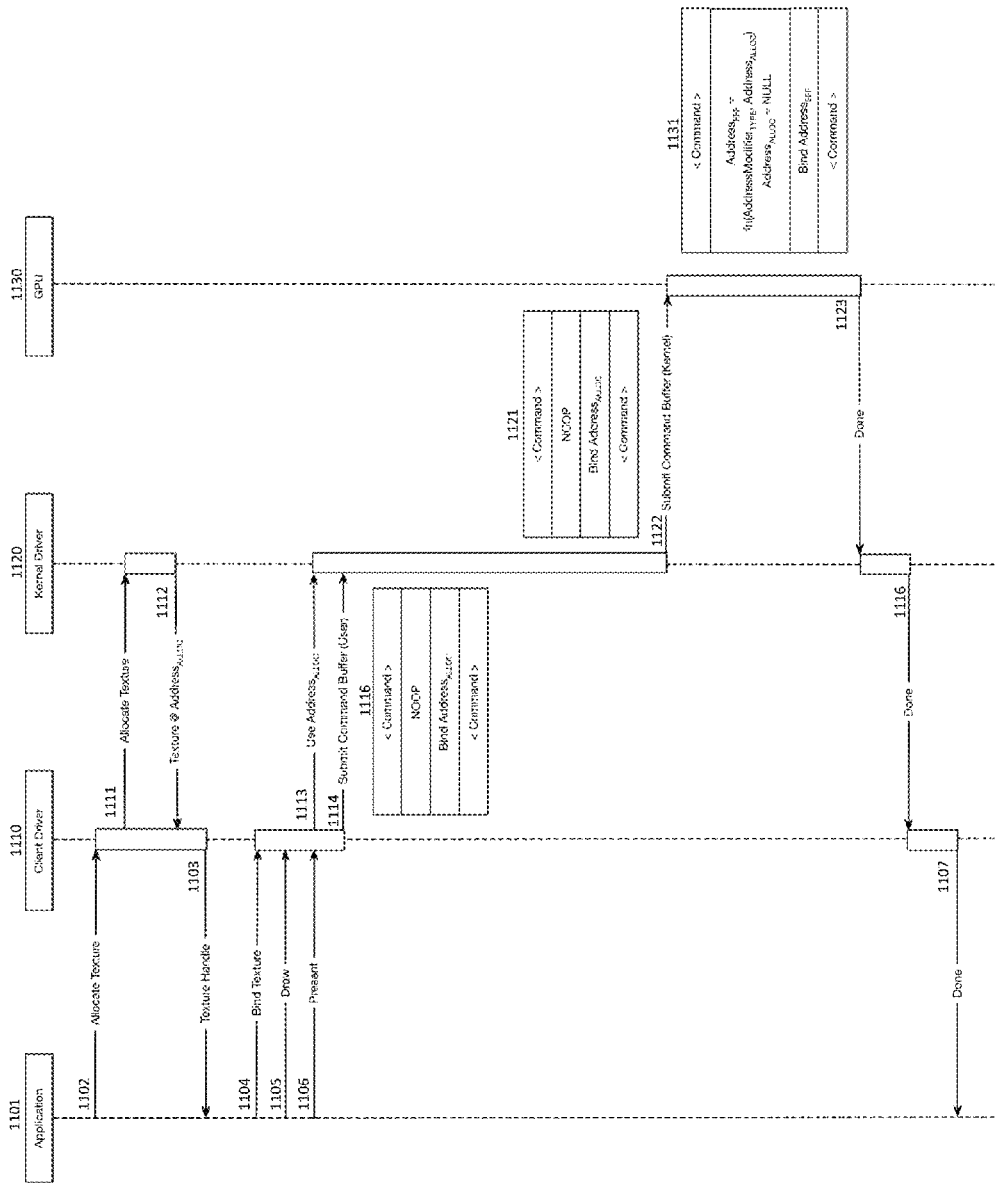

With reference to FIG. 11, because FIG. 11 is similar to FIGS. 7-10, some discussion with respect to FIG. 11 regarding options and alternatives may be omitted for efficiency. The skilled artisan may review the discussions regarding FIGS. 7-11 and recognize that many concepts discussed with respect to one figure apply in some or all of the others. As discussed above, many embodiments perform transformation of an allocated address to an effective address. Some of the embodiments expose the transformation to the kernel driver, while some of the embodiments perform the transformation in hardware, such as the GPU, so that no software is aware of the randomized resource locations or even the randomization process. Some of the embodiments where transformation is confined to the GPU may be implemented by altering the page tables for the GPU to appropriately reflect the effective address and a real address that are hidden from all software.

For example, regarding resource-based transformations discussed above, an allocated address may be submitted to the GPU by the kernel driver, e.g. as part of a command buffer. With reference to FIG. 11, a now familiar diagram is shown, where the kernel driver's command buffer 1121 uses allocated addresses, while the GPU's command buffer 1131 uses effective addresses, making the allocated address null.

The technique of using altered page tables to provide randomization may be combined with any of the other embodiments discussed herein. For example, by altering the GPU firmware, the GPU may be caused to apply a slide value to all allocated addresses for resources originating for a single process. The slide value may be applied by nullifying the allocated addresses in the page table and mapping the resource to a set of effective addresses determined using the slide value. A different slide value may be used for each different process, including, for some embodiments, multiple instantiations of the same application.

As another example, alterations in GPU internal programming can cause the GPU to apply a function to an incoming resource address, in order to generate an effective address, where an applicable resource may be mapped in the applicable page tables (typically the page tables for the process that originated the request). The function may depend on the allocated address in addition to any number of other factors, including, without limitation: a submission ID; a context ID; information regarding a relevant resource; the type of resource being handled; and/or the date or time; the value of one or more sensor readings on the host. Furthermore, in some embodiments, the GPU may apply the function: for all resources from an instantiation of a process; for all resources associated with a certain GPU context; for all resources associated with a certain command buffer submission; for all resources of a certain type; or for a single resource only.

In one embodiment, and as shown in FIG. 11 at 1122, when the command buffer seeks to bind the resource address as the allocated address 1121, the GPU recognizes the resource type and aliases the location of the resource to a set of effective addresses. In some embodiments, the GPU may recognize the resource type as a sensitive type (e.g., a render target), and alter its page tables to alias the location of the resource to a set of different addresses—effective addresses. By altering the page tables, the physical location of the resource may remain unchanged, but the allocated addresses for the resource may become nullified, which may be indicated in some embodiments by removing the read and write privileges from the page table entries referencing the allocated addresses. Ultimately, the effective addresses becomes randomized or, depending upon the function or slide employed in varying embodiments, at least non-deterministic.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method comprising:
   receiving a request to allocate a graphics resource, the request being associated with a first instantiation of a process having a virtual memory space associated with a GPU (graphics processing unit);
   allocating the graphics resource in association with the first instantiation of the process, the graphics resource being associated with an allocated virtual address, which is part of the virtual memory space;
   receiving a request to use the graphics resource;
   in response to the request to use the graphics resource, generating a command buffer comprising the allocated virtual address;

transforming the allocated virtual address into an effective virtual address, which is part of the virtual memory space, wherein the effective virtual address is generated based upon at least the allocated virtual address and a second factor;

executing the command buffer by a GPU using the effective virtual address;

receiving a second request to allocate the graphics resource, the second request being associated with a second instantiation of the process;

allocating the graphics resource in association with the second instantiation of the process, such graphics resource associated with the second instantiation of the process also being associated with a second allocated virtual address;

transforming the second allocated virtual address into a second effective virtual address based upon at least the second allocated virtual address and an altered version of the second factor, such that the effective virtual address is different from the second effective virtual address even if the allocated virtual address is the same as the second allocated virtual address; and executing a second command buffer using the second effective virtual address.

2. The method of claim 1, wherein transforming the allocated virtual address into an effective virtual address comprises:

generating the effective virtual address by applying a function to the allocated virtual address and a slide value, wherein the slide value is randomly selected.

3. The method of claim 1, wherein transforming the allocated virtual address into an effective virtual address comprises:

generating the effective virtual address by applying a function to the allocated virtual address and a value associated with a GPU context ID, wherein the GPU context ID is associated with a GPU context that is used to execute the command buffer.

4. The method of claim 1, wherein transforming the allocated virtual address into an effective virtual address comprises:

generating the effective virtual address by applying a function to the allocated virtual address and a value associated with a command buffer submission ID, wherein the command buffer submission ID is the ID of the command buffer.

5. The method of claim 1, wherein transforming the allocated virtual address into an effective virtual address comprises:

generating the effective virtual address by applying a function to the allocated virtual address and a value associated with a resource type, wherein the graphics resource is the same type as the resource type.

6. The method of claim 5, wherein the resource type is chosen from the following types: a render target, a texture, and a client buffer.

7. The method of claim 1, wherein transforming the allocated virtual address into an effective virtual address comprises applying the same function for all resources associated with the first instantiation of the process, and not applying the same function for resources associated with other processes during the same computing session.

8. The method of claim 1, wherein transforming the allocated virtual address into an effective virtual address comprises applying the same function for all resources associated with submission of the command buffer and not applying the same function for resources associated with other command buffer submissions that are associated with the same process.

9. The method of claim 1, wherein transforming the allocated virtual address into an effective virtual address comprises applying the same function for all resources associated with a GPU context and not applying the same function for resources associated with other GPU contexts during the same computing session, wherein the GPU context is a context of the GPU.

10. The method of claim 1, wherein transforming the allocated virtual address into an effective virtual address comprises applying the same function for all resources associated as belonging to a group of resource types and not applying the same function for resources associated with resource types that do not belong to the group of resource types.

11. The method of claim 10, wherein the group of resource types includes only a single resource type that is chosen from the following: rendering target, texture, and client buffer.

12. The method of claim 1, wherein transforming the allocated virtual address into an effective virtual address occurs in a driver residing in an operating system kernel.

13. The method of claim 1, wherein transforming the allocated virtual address into an effective virtual address occurs in the GPU.

14. A non-transitory program storage device, readable by a processor and comprising instructions stored thereon to cause one or more processors to:

receive a request to allocate a graphics resource, the request being associated with a first instantiation of a process having a virtual memory space associated with a GPU (graphics processing unit);

allocate the graphics resource in association with the first instantiation of the process, the graphics resource being associated with an allocated virtual address, which is part of the virtual memory space;

receive a request to use the graphics resource;

in response to the request to use the graphics resource, generate a command buffer comprising the allocated virtual address;

transform the allocated virtual address into an effective virtual address, which is part of the virtual memory space, wherein the effective virtual address is generated based upon at least the allocated virtual address and a second factor;

execute the command buffer by a GPU using the effective virtual address;

receive a second request to allocate the graphics resource, the second request being associated with a second instantiation of the process;

allocate the graphics resource in association with the second instantiation of the process, such graphics resource associated with the second instantiation of the process also being associated with a second allocated virtual address;

transform the second allocated virtual address into a second effective virtual address based upon at least the second allocated virtual address and an altered version of the second factor, such that the effective virtual address is different from the second effective virtual address even if the allocated virtual address is the same as the second allocated virtual address; and execute a second command buffer using the second effective virtual address.

15. The non-transitory program storage device of claim 14, wherein the instructions to cause one or more processors to transform the allocated virtual address into an effective virtual address further comprise instructions to:
generate the effective virtual address by applying a function to the allocated virtual address and one or more of a slide value, a value associated with a GPU context ID, a value associated with a command buffer submission ID, and a value associated with a resource type.

16. The non-transitory program storage device of claim 14, wherein the instructions to cause one or more processors to transform the allocated virtual address into an effective virtual address further comprise instructions to apply the same function for all resources associated with a GPU context and not to apply the same function for resources associated with other GPU contexts during the same computing session, wherein the GPU context is a context of the GPU.

17. A system comprising:
a first GPU (graphics processing unit) that is one of a group of GPUs, wherein the group of GPUs includes one or more GPUs;
one or more CPUs (central processing units) for:
receiving a request to allocate a graphics resource, the request being associated with a first instantiation of a process having a virtual memory space associated with the first GPU;
allocating the graphics resource in association with the first instantiation of the process, the graphics resource being associated with an allocated virtual address, which is part of the virtual memory space;
receiving a request to use the graphics resource;
in response to the request to use the graphics resource, generating a command buffer comprising the allocated virtual address;
transforming, by one of a CPU or the first GPU, the allocated virtual address into an effective virtual address, which is part of the virtual memory space, wherein the effective virtual address is generated based upon at least the allocated virtual address and a second factor;
executing the command buffer by the first GPU using the effective virtual address;
receiving a second request to allocate the graphics resource, the second request being associated with a second instantiation of the process;
allocating the graphics resource in association with the second instantiation of the process, such graphics resource associated with the second instantiation of the process also being associated with a second allocated virtual address;
transforming the second allocated virtual address into a second effective virtual address based upon at least the second allocated virtual address and an altered version of the second factor, such that the effective virtual address is different from the second effective virtual address even if the allocated virtual address is the same as the second allocated virtual address; and
executing a second command buffer using the second effective virtual address.

18. The system of claim 17, wherein transforming the allocated virtual address into an effective virtual address comprises:
generating the effective virtual address by applying a function to the allocated virtual address and a value associated with a command buffer submission ID, wherein the command buffer submission ID is an ID of the command buffer.

19. The system of claim 17, wherein transforming the allocated virtual address into an effective virtual address is performed by the first GPU.

20. The system of claim 19, wherein transforming the allocated virtual address into an effective virtual address comprises altering page tables associated with the process.

* * * * *